UNITED STATES PATENT OFFICE.

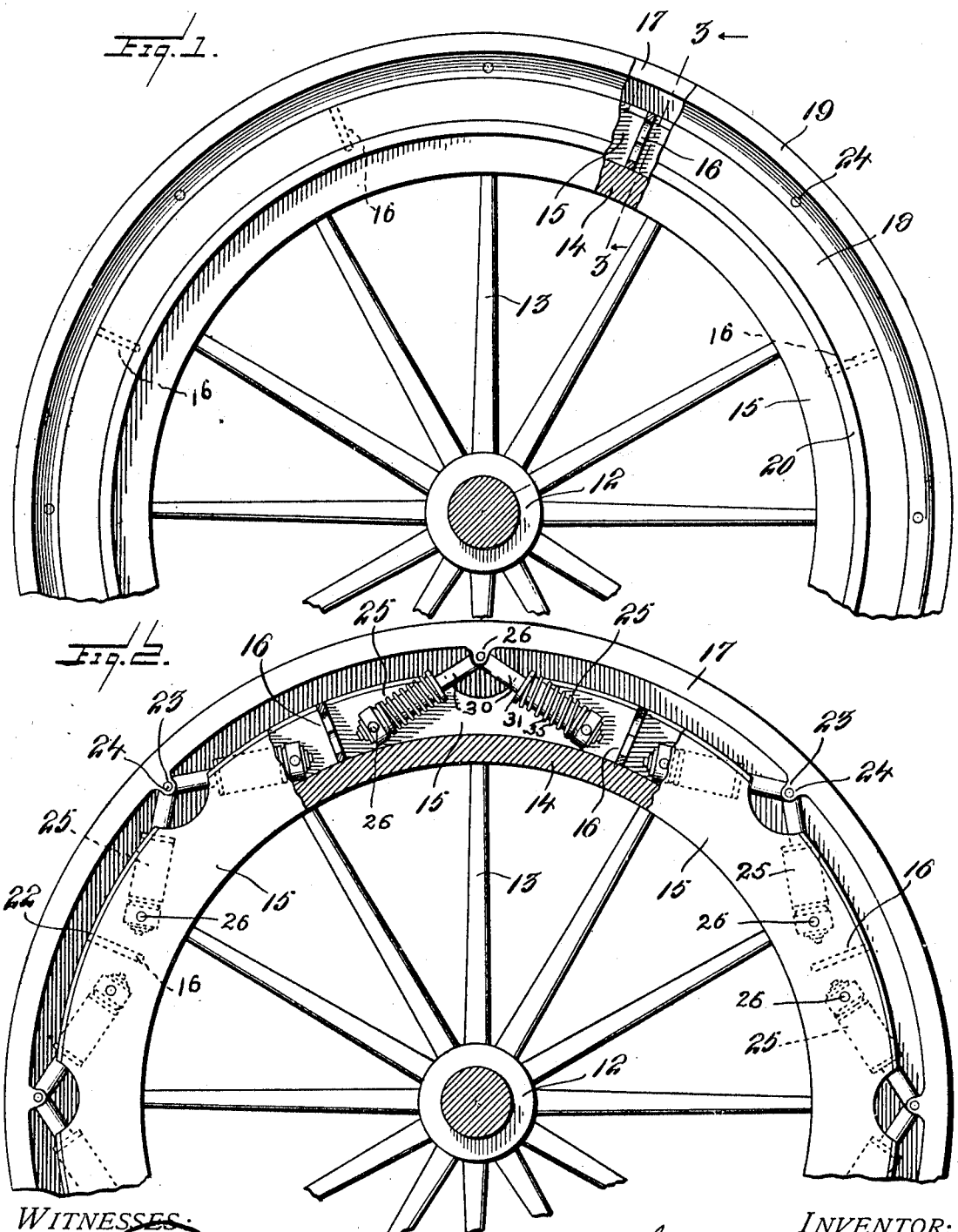

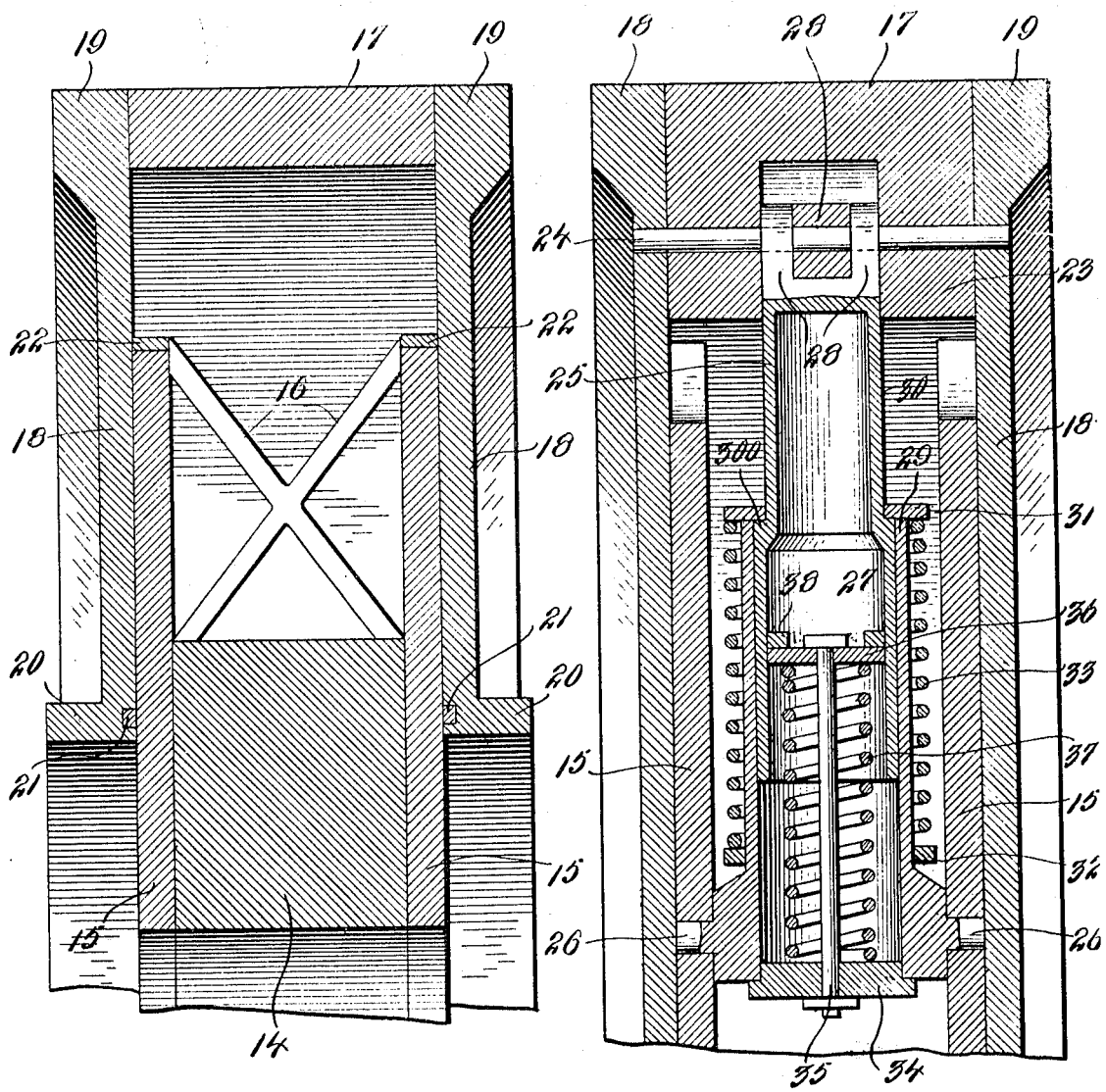

CHARLES F. WREN, OF PRESCOTT, ARIZONA, ASSIGNOR, BY MESNE ASSIGNMENTS, TO CHARLES E. WOODS, OF LIBERAL, KANSAS.

SPRING-TIRE.

1,039,469.  Specification of Letters Patent.  Patented Sept. 24, 1912.

Application filed January 7, 1908. Serial No. 409,602.

*To all whom it may concern:*

Be it known that I, CHARLES F. WREN, a citizen of the United States, residing at Prescott, in the county of Yavapai and State of Arizona, have invented or discovered certain new and useful Improvements in Spring-Tires, of which the following is a specification, reference being had therein to the accompanying drawings.
This invention relates to resilient tires or treads for vehicle wheels, more particularly wheels of automobiles, designed to take the place of the pneumatic tires usually employed.
The invention is especially applicable to that type of resilient wheel tread construction comprising an interior rim rigidly supported by spokes from the hub of a wheel and an exterior rim or tread portion yieldingly supported from said interior rim, although certain features thereof will be seen to be of equal utility in resilient tread devices of other types.

Devices of the above type as heretofore constructed have been of very little practical value for the reason that few, if any, of such devices have been provided with means for enabling the same to withstand side strains, such as are necessarily placed upon them when the vehicle turns a corner at relatively high speed, or when said vehicle is traveling upon rough and uneven ground, or upon the side of a hill. Furthermore such devices as heretofore constructed have, as a rule, been designed solely to resist the stresses caused by the weight of the vehicle and the reaction of the ground, and have had no adequate provision for resisting the torsional strains thrown upon the wheel by the motor of a self-propelling vehicle, and which will have a tendency to turn the inner rim within the outer rim or tread portion. In devices of this character it will further be seen that, aside from the traction forces, under the weight of the vehicle alone, when the inner rim moves downwardly at the bottom with respect to the outer rim it must also move a corresponding amount in the same direction at the top, and also move peripherally with respect to said outer rim at the sides of the wheel. Most of the resilient devices heretofore employed for connecting the inner and outer rims have been designed for the purpose of resisting compression or expansion only, and, so far as I am aware, no efficient and practical device of this character has as yet been devised which is capable of permitting the peripheral movement referred to without abnormal distortion of these connecting devices.

Some of the principal objects, therefore, of my invention are to provide a resilient tire or tread construction for vehicle wheels which will overcome the objections above referred to, which will be strong and durable, which will have its working parts protected from dirt and moisture, which will have few wearing parts and whose wearing parts may be readily replaced when necessary, which will not be unsightly, which will not tend to throw up dust or mud, whose parts may be easily assembled and disassembled when desired, and which will be inexpensive to construct.

Other objects of my invention, together with means whereby the same may be carried into effect, will best be understood from the following detailed description of one form or embodiment thereof illustrated in the accompanying drawings. It is to be understood however that the construction shown and described has been chosen for illustrative purposes merely, and that the invention may be embodied in many other forms without departing from the spirit and scope thereof.

In said drawings:—Figure 1 is a side elevation of a portion of a wheel with parts broken away having a rim constructed in accordance with my invention. Fig. 2 is a similar view with one of the side plates removed. Fig. 3 is a transverse sectional view of the rim, taken substantially on the line 3—3, Fig. 1. Fig. 4 is a sectional view of one of the elastic supporting elements.

The wheel proper comprises the usual hub 12 and spokes 13, supporting an inner rim 14 provided with a pair of rigidly attached annular side plates or portions 15 of an exterior diameter somewhat greater than the exterior diameter of said rim 14. Means are preferably associated with the side plates or portions 15 for resisting lateral flexure of the latter, whereby said portions are enabled to withstand side strains, such means, as herein shown, being provided by cross struts or braces 16. The outer rim or tread portion 17 surrounds the inner rim 14 and plates 15, and is of sufficient diameter normally to leave a suitable space between its interior surface and the outer edges of the plates 15 to admit of the necessary yielding movement of said tread portion. The outer rim 17, may, if desired, have its tread surface covered with rubber or other suitable material for the purpose of deadening the noise, and is provided with rigidly attached side plates or portions 18 adapted to overlap and engage the lateral surfaces of the plates 15, said parts 18 being preferably provided with thickened portions 19 and 20 to give the same additional rigidity. Suitable packing strips 21 are preferably interposed between the plates 18 and 15 for the purpose of excluding dirt and moisture, and the outer edges of the plates 15 may, if desired, be provided with suitable cushions or buffers 22 to cushion the contact between said plates 15 and the outer rim 17 in case of an abnormal strain which will bring the parts in contact with one another.

The outer rim or tread portion 17 is provided at intervals around its interior with suitable lugs or ears 23 to each of which is pivoted, by means of a suitable pin or bolt 24, a pair of oppositely extending resilient supporting devices 25 pivoted at their opposite ends at 26 to the plates 15. These resilient devices, whose preferred construction will hereinafter be described, are each adapted to resist yieldingly both tension and compression, and when in normal position maintain the rims 14 and 17 in a certain predetermined relation to one another. It will be seen, however, that any tendency to disturb this predetermined relation will be resisted by all of the devices 25, such tendency placing some of these devices under tensile and others under compressive stresses. For example, under ordinary circumstances, with the weight of the vehicle upon the hub 12 and such weight resisted by the reaction of the ground against the rim 17, the devices 25 at the bottom of the wheel will be placed under compression and those at the top of the wheel under tension, while of those at the side of the wheel one of each pair will be placed under tension and the other under compression, the devices turning freely on their pivots under any eccentric stresses, the construction and arrangement of these devices being such as to permit a relative movement of the rims 14 and 17 without subjecting any of the devices 25 to any strains other than those for which they are designed. It will furthermore be seen that the tendency of the motor of the vehicle to turn the wheel relative to the outer rim 17 will be suitably resisted by the devices 25 without any danger of undue or lateral strain upon these devices. It will furthermore be seen that any side strains thrown upon the wheel in turning corners or when traveling upon uneven ground will be resisted by the engagement of the laterally rigid plates 18 with the rigid plates 15, against which, as will be seen from Fig. 3, they have an extended bearing, while the plates 15 in turn are enabled to withstand the lateral strain by virtue of their own rigidity and the strength afforded by the cross struts or braces 16.

The preferred construction of the resilient supporting devices 25 is shown in Fig. 4. As shown in this figure each of said devices comprises a pair of telescoping tubes, an inner tube 27, provided with an ear or ears 28 for the reception of the pin or bolt 24, and an outer tube 29 provided at its end with a suitable pivoting device 26, above referred to. The inner tube 27, at its outer end, has a portion 30 of reduced diameter providing, at a point substantially corresponding to the position of the end of the outer tube 29 when the parts are in normal position and at the inner end of said reduced portion an offset or shoulder 300 against which normally rests a washer or loose collar 31, said washer or collar being free to move longitudinally on the reduced portion 30 of said tube 27. Secured at one end to the washer 31 and at its opposite end to a suitable support 32 rigid with the tube 29 is a suitable tension spring 33. This attachment of the parts referred to may be effected simply by soldering said parts together.

The tube 29 may be formed with a permanently closed outer end, or this end may be formed by a suitable disk 34 as desired. Suitably secured to the closed end 34 is a rod 35, loosely extending through a suitable washer or disk 36, loosely fitting the interior of the tube 27, said rod 35 having its inner end enlarged or provided with a head as shown, or being otherwise provided with a stop or other means for limiting its movement with respect to said washer or disk 36. Interposed between the washer or disk 36 and the closed end 34 of the tube 29 is a suitable compression spring 37, while the inward movement of the washer or disk 36 with respect to the tube 27 is limited by a stop 38, carried by said tube 27 on the interior thereof.

With the construction shown it will be seen that tensile stresses tending to lengthen the device 25 as a whole will be resisted by the spring 33 acting at one end upon the tube 29 and at the other, through the washer or collar 31 which is at this time held in engagement with the shoulder 300, upon the tube 27, while compressive stresses tending to shorten the device 25 will be resisted by the compression spring 37 acting at one end upon the closed end 34 of the member 29 and at the other, through the disk 36 and stop 38, upon the member 27. It will furthermore be seen that, although when the device 25 is under compression the spring 37 acts against the stop 38 through the washer or disk 36, if the compression be discontinued and the device be subjected to tension so that the inner tube 27 is drawn outwardly from the tube 29, the force of the spring 37 upon the tube 27 is discontinued and the spring 37 rendered inoperative, since the movement of the disk 36 upon the rod 35 is limited by the enlarged end of said rod. Furthermore it will be seen that when the device is subjected to compression and the tube 27 pushed into the tube 29, the washer 31 remains stationary, the same being in contact with the end of the tube 29, so that while the device is under compression the force of the tension spring 33 is discontinued and this spring rendered inoperative. It will thus be seen that the two springs are entirely independent of one another and do not tend to neutralize the action of each other since only one of these springs can act at a time. With the parts in normal position, as shown in Fig. 4, each of these springs is in a position to act, and if the parts be moved in one direction one of these springs will act and the other will be thrown out of operation, and vice versa. The parts will preferably be so constructed and proportioned that when in normal position both of the springs 33 and 37 will be inoperative, but upon slight relative movement of the members 27 and 29 in either direction one or the other of these springs will be thrown into operation.

With the construction just described the devices 25 place no initial or normal strain upon the structure as a whole. The removal of one or more of these devices is therefore rendered easy. Moreover no delicate adjustment of initial tensions is necessary in order that the structure as a whole may be properly balanced, while the breaking of one of the devices is not a serious matter as the strains can temporarily be resisted by the others and no delicate balance is disturbed.

In similar constructions as heretofore used the resilient devices, such as springs, employed to connect the inner and outer rims have, as a rule, been radially arranged and have been designed to resist tension or compression only. The weight of the vehicle at any particular time will therefore be thrown upon a comparatively few of these devices, those at the bottom of the wheel if designed for compression or those at the top of the wheel if designed for tension, and these devices must therefore each be constructed strong enough to bear this weight and the jars incident to the travel of the vehicle. Moreover at the sides of the wheel, due to the weight of the vehicle, and throughout the wheel, due to the traction force of the motor, these devices are subjected to lateral stresses tending to distort them and which they have not been designed to resist. In a few cases it has been proposed to arrange these springs at an angle to the radius of the wheel in order, in a measure, to withstand these lateral strains. In all such constructions, however, these springs have been rigidly secured to the rims and are therefore not entirely free from the eccentric stresses above referred to, or have, in themselves, been possessed of little or no lateral rigidity and are therefore almost wholly incapable of resisting effectively the strains of tension and compression present at the top and bottom of the wheel. With my construction, however, it will be seen that every stress thrown upon the wheel will be divided up among all of the supporting devices 25, each one of which is therefore called upon to resist very little strain, and these devices may therefore be made comparatively light and very resilient. Moreover, since these devices are so constructed, by virtue of the telescoping and mutually guided tubular members 27 and 29, as to have considerable lateral rigidity, and are pivoted at their ends so as to turn freely under forces circumferential to the wheel, the whole structure possesses the properties of an articulated truss, in which the load is carried by all the members in the form of tensile or compressive stresses and without any eccentric loading upon the individual members. It will furthermore be seen that, by virtue of the lateral rigidity of the members 25 and the character of their pivotal connections at 24 and 26, these devices or members are constrained to turn about their pivots substantially in a single plane. This construction coöperates with the interengaging side members 15 and 18 in resisting side strains and in maintaining the resilient rim or tire in proper position in turning corners and upon rough or uneven ground.

Having thus described my invention what I claim as my invention and desire to secure by Letters Patent is:—

1. In a tire, the combination with substantially rigid inner and outer rims, of a plurality of supporting devices independently connected at their opposite ends to said inner and outer rims respectively, said devices being provided with means for yieldingly resisting both tension and compression applied thereto and stops for limiting the operation of said resisting means.

2. In a tire, the combination with substantially rigid inner and outer rims provided with laterally rigid overlapping side portions, of a plurality of alternately oppositely disposed and laterally rigid supporting devices independently pivoted at their opposite ends to said inner and outer rims respectively, said devices being provided with means for yieldingly resisting both tension and compression applied thereto and stops for limiting the operation of said resisting means.

3. In a vehicle wheel, the combination with a rim provided with side plates, of transverse, inclined struts for bracing said side plates against lateral strains.

4. In a vehicle wheel, the combination with a tread member, of laterally rigid and oppositely inclined devices for supporting said tread member, said devices being provided with means for yieldingly resisting tension applied thereto, and means for rendering said tension-resisting means inoperative when said device is in normal condition.

5. In a vehicle wheel, the combination with a tread member, of a device for supporting said tread member, means for yieldingly resisting both tension and compression applied to said device, and stops for limiting the operation of both of said resisting means.

6. In a vehicle wheel, a supporting device comprising two telescoping tubular members, a spring for yieldingly resisting relative movement of said members in one direction, a second spring for yieldingly resisting relative movement of said members in the opposite direction, and stops for rendering each of said springs inoperative when the other is in operation.

7. In a vehicle wheel, a supporting device comprising two telescoping tubular members, one of said members having a reduced portion providing a shoulder lying, when said parts are in normal position, adjacent the end of the other member, a collar loosely mounted on said reduced portion, and a spring connecting said collar and said other member.

8. In a vehicle wheel, a supporting device comprising two telescoping tubular members, one of said members having a closed end, and a rod carried by said closed end and entering the other of said members, a stop on the end of said rod, a collar loosely mounted on said rod, a spring interposed between said collar and said closed end, and means on the interior of said last-named member for engaging said collar.

9. In a tire, the combination with substantially rigid inner and outer rims, of a plurality of yielding supporting devices independently pivoted at their opposite ends to said rims, said devices being provided with resilient means for resisting all longitudinal forces applied thereto and with means for limiting the initial action of said resilient means.

10. In a tire, the combination with a substantially rigid inner rim and a substantially rigid outer rim, said rims having overlapping laterally rigid side portions, of a plurality of alternately oppositely inclined, laterally rigid and longitudinally yielding supporting devices independently pivoted at their opposite ends to said rims, said devices being provided with springs for resisting all longitudinal forces applied thereto and with stops for limiting the initial tension of said springs.

11. In a vehicle wheel, the combination with a substantially rigid inner rim, a substantially rigid outer rim and overlapping, laterally rigid side plates carried by said rims, of a plurality of supporting devices connecting said rims each device having means for yieldingly resisting contraction of said device, and stops carried by said devices and independent of said rims for limiting said resisting means.

In testimony whereof I affix my signature, in presence of two witnesses.

CHARLES F. WREN.

Witnesses:
W. E. GINDER,
JNO. J. HAWKINS.